United States Patent
Sa et al.

(10) Patent No.: US 7,230,394 B2
(45) Date of Patent: Jun. 12, 2007

(54) APPARATUS AND METHOD FOR CONTROLLING MOTOR IN WASHING MACHINE

(75) Inventors: Mi Hyun Sa, Suwon-Si (KR); Seung Moo Lim, Suwon-Si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/176,298

(22) Filed: Jul. 8, 2005

(65) Prior Publication Data
US 2006/0087263 A1    Apr. 27, 2006

(30) Foreign Application Priority Data
Oct. 26, 2004    (KR) ............... 10-2004-0085808

(51) Int. Cl.
*H02P 5/00*    (2006.01)
*H02P 23/00*    (2006.01)

(52) U.S. Cl. ............... 318/66; 318/800; 318/807; 318/434; 8/159

(58) Field of Classification Search .............. 318/66, 318/430, 434, 807; 8/158, 159
See application file for complete search history.

(56) References Cited

U.S. PATENT DOCUMENTS

| | | | | |
|---|---|---|---|---|
| 5,677,606 A * | 10/1997 | Otake | ............. | 318/434 |
| 5,970,555 A * | 10/1999 | Baek et al. | .......... | 8/159 |
| 6,282,965 B1 * | 9/2001 | French et al. | ........... | 73/660 |
| 6,381,791 B1 * | 5/2002 | French et al. | ........... | 8/159 |
| 6,609,264 B2 * | 8/2003 | Ruhl et al. | ........... | 8/158 |
| 2002/0050011 A1 * | 5/2002 | Cho et al. | ........... | 8/159 |
| 2004/0068804 A1 * | 4/2004 | Kim et al. | ........... | 8/158 |
| 2004/0189243 A1 * | 9/2004 | Tobari et al. | .......... | 318/807 |
| 2005/0086743 A1 * | 4/2005 | Kim et al. | ........... | 8/158 |
| 2005/0097680 A1 * | 5/2005 | Kim et al. | ........... | 8/158 |

FOREIGN PATENT DOCUMENTS

| | | |
|---|---|---|
| GB | 2 247 579 A | 3/1992 |
| JP | 2004-261275 A | 9/2004 |

OTHER PUBLICATIONS

EP 05 254206 Search Report Nov. 20, 2006.

* cited by examiner

*Primary Examiner*—Paul Ip
(74) *Attorney, Agent, or Firm*—Sughrue Mion, PLLC

(57) ABSTRACT

An apparatus for controlling a motor in a washing machine, which includes a speed sensor for measuring speed of the motor, and a controller that compares the measured speed with a target speed to estimate a motor power applied to the motor, adjusts a running rate of the motor according to the comparison, and controls the motor according to the adjusted running rate. The motor power is estimated based on the motor speed, and the running rate is adjusted down if the estimated motor power is too high, thereby preventing overheating of the motor and an inverter, which may be caused in wash or rinse cycles. The apparatus can be implemented without using a temperature sensor, thereby reducing economic burden. Further, the motor does not stop due to an increase in the temperature of the motor, thereby preventing an unnecessary increase in the time required to complete washing.

8 Claims, 3 Drawing Sheets

APPARATUS AND METHOD FOR CONTROLLING MOTOR IN WASHING MACHINE

CROSS-REFERENCE TO RELATED APPLICATION

This application claims priority from Korean Patent Application No. 2004-85808, filed on Oct. 26, 2004 in the Korean Intellectual Property Office, the disclosure of which is incorporated herein by reference.

BACKGROUND OF THE INVENTION

1. Field of the Invention

Apparatuses and methods consistent with the present invention relate to controlling a motor in a washing machine, and more particularly, to controlling a motor in a washing machine, in which a running rate of the motor is adjusted according to a motor power applied to the motor, which is estimated based on the speed of the motor.

2. Description of the Related Art

Washing machines generally have a washing motor for rotating a tub or a pulsator.

A highly efficient, high performance Brushless Direct Current (BLDC) Motor is typically used as the washing motor.

The washing machine generally includes an inverter to drive the washing motor. However, if overload occurs in the washing motor, the washing motor and the inverter may overheat to an abnormal temperature.

To prevent the overheating of the washing motor and the inverter, conventional motor control units employ a method in which a temperature sensor provided on the washing motor is used to detect the temperature of the motor, and if the detected motor temperature is high, the current washing pattern is changed to another one, and the motor is driven according to the changed washing pattern. However, this method increases manufacturing costs due to the use of the temperature sensor. Another method may be employed to prevent overheating, in which the operation of the washing motor is stopped if the temperature of the motor detected by the temperature sensor is high, and the operation of the washing motor is resumed if the detected temperature is reduced to a safe temperature. However, this method causes an unnecessary increase in the time required to complete washing since the operation of the motor is stopped to reduce the motor temperature.

SUMMARY OF THE INVENTION

It is an aspect of the invention to provide an apparatus and method for controlling a motor in a washing machine, in which a running rate of the motor is adjusted according to a motor power applied to the motor, which is estimated based on the speed of the motor, thereby preventing the temperature of both the motor and an inverter from rising to an abnormal temperature.

In accordance with an aspect of the invention, there is provided an apparatus for controlling a motor in a washing machine, the apparatus comprising: a speed sensor for measuring speed of the motor; and a controller for comparing the measured speed with a target speed to estimate a motor power applied to the motor, adjusting a running rate of the motor according to the comparison, and controlling the motor according to the adjusted running rate.

The controller averages differences between speeds measured by the speed sensor and the target speed, and compares the average difference with a reference value to adjust the running rate of the motor.

The apparatus further comprises an input unit for setting an operating cycle of the washing machine; and a storage unit for storing a set running rate corresponding to the set operating cycle, wherein the controller uses the set running rate when the motor starts, and adjusts the running rate of the motor to be lower than the set running rate if the average of the differences between the measured and target speeds during an on time according to the set running rate is less than the reference value.

The controller accumulates the differences between the measured and target speeds during an on time according to a running rate of the motor in a period of the motor, and averages the accumulated differences.

If the controller determines in the period that it is desired to adjust the running rate of the motor, the controller uses the adjusted running rate from a next period.

In accordance with another aspect of the invention, there is provided a method for controlling a motor in a washing machine, the method comprising setting a running rate of the motor according to an operating cycle of the washing machine; measuring speed of the motor during an on time according to the set running rate; comparing the measured speed with a target speed to estimate a motor power applied to the motor; adjusting the running rate of the motor according to the comparison; and controlling the motor according to the adjusted running rate.

The comparison of the measured speed with the target speed comprises averaging differences between speeds measured by the speed sensor and the target speed during an on time according to the running rate of the motor; comparing the average difference with a reference value; and adjusting the running rate set for the operating cycle of the washing machine by decreasing the running rate if the average difference is larger than the reference value.

The controller adjusts the running rate of the motor based on the set running rate, the average difference, and the reference value.

The operating cycle is a wash or rinse cycle in which the motor alternately runs and stops.

The running rate of the motor is applied on a periodic basis, and if it is determined that it is necessary to adjust the running rate of the motor according to the difference between the measured and target speeds in a period, an adjusted running rate is applied from a next period.

BRIEF DESCRIPTION OF THE DRAWINGS

The above and/or other aspects and advantages of the invention will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
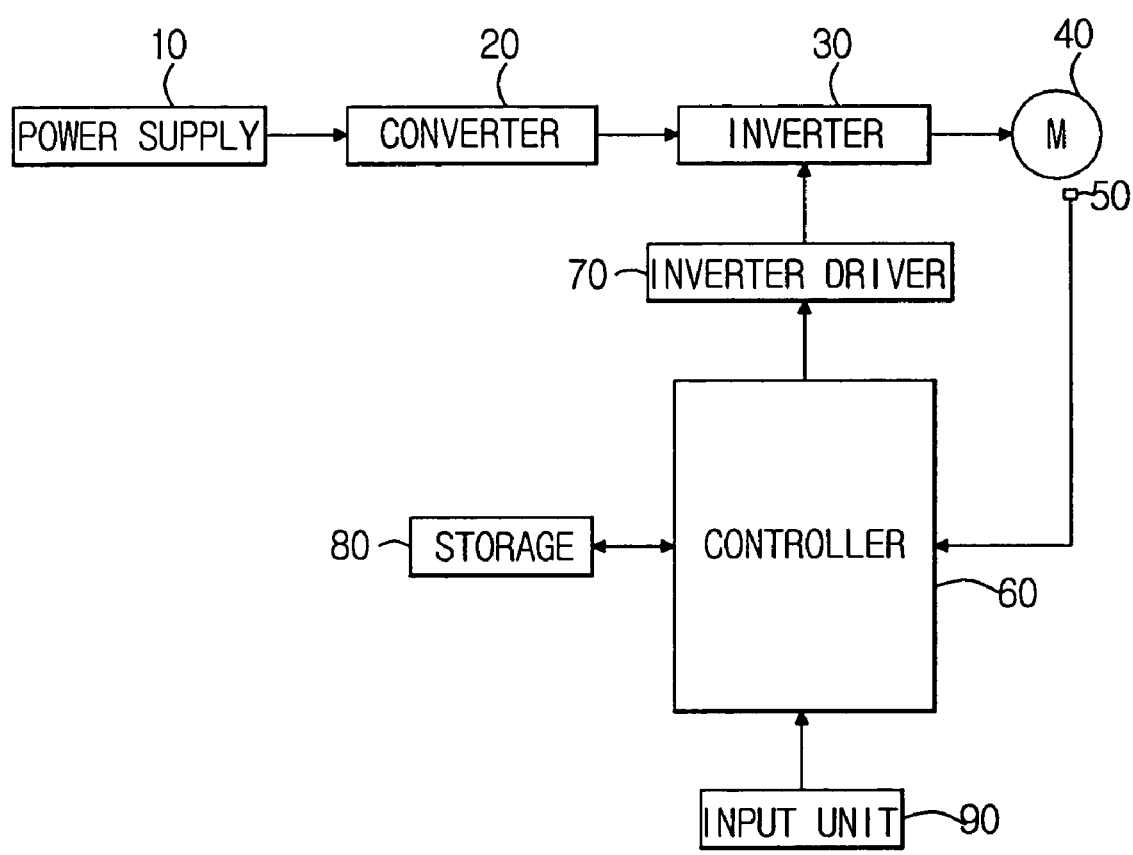
FIG. 1 is a block diagram of an apparatus for controlling a motor in a washing machine according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below to explain the present invention by referring to the figures.

The present invention will be described with reference to an apparatus for controlling a motor in a washing machine that is applied to a washing motor driven by an inverter. However, the present invention is not limited to the washing motor. For example, the present invention can also be applied to a motor that generates a motive power for driving a pulsator or rotating a tub to perform washing.

If overload occurs in the washing motor, not only the temperature of the washing motor but also the temperature of the inverter including a switching element for driving the washing motor are increased to an abnormal temperature.

The increase of the temperature of the washing motor is related to both a running rate of the motor and a motor power applied to the motor. The motor power has a functional relationship with the difference between the speed of the motor and a target speed thereof.

Taking these facts into account, in the present invention, a motor power applied to the motor is estimated based on the speed of the motor, and a running rate of the motor, set according to an operating cycle, is adjusted so that the motor power is within an appropriate range, thereby preventing motor overload and thus preventing the temperature of both the motor and the inverter from becoming excessively high.

As shown in FIG. 1, an apparatus for controlling a motor in a washing machine according to the present invention includes an inverter 30 for supplying drive power to a motor 40. The inverter 30 is connected to a power supply unit 10 through a converter 20, and is connected to a controller 60 through an inverter driver 70. The converter 20 converts AC power received from the power supply unit 10 to DC power, and outputs the DC power to the inverter 30. The inverter 30, which includes a switching element, converts the DC power received from the converter 20 to AC power and supplies the AC power to the motor 40, so that the motor 40 runs at a desired speed.

A speed sensor 50 is provided to detect the speed of the motor 40 during operation, and provides a motor speed signal indicating the detected motor speed to the controller 60. The speed sensor 50 is implemented using a hall sensor.

The controller 60 detects the speed of the motor 40 based on the motor speed signal received from the speed sensor 50, and outputs a motor control signal to the inverter driver 70 so that the motor speed reaches a target speed. The inverter driver 70 outputs an inverter drive signal to the inverter 30 so as to drive the switching element in the inverter 30 based on the motor control signal from the controller 60.

The user uses an input unit 90 to set a desired operating cycle of the washing machine.

In response to the setting of the operating cycle of the washing machine through the input unit 60, the controller 60 receives information of a set running rate corresponding to the set operating cycle from a storage unit 80, and drives the motor 40 according to the set running rate. The set running rate of the motor 40 in the operating cycle such as a wash or rinse cycle is determined based on the ratio between motor-on and off times that are applied to the operating rate. A corresponding one of the set running rates is selected according to the operating cycle set by the user.

The storage unit 80 stores motor drive information such as set running rates corresponding respectively to operating cycles of the washing machine.

Overload may occur in the motor 40 depending on wash load and absorption properties of the washes. If the motor overload is neglected, a motor coil produces heat, raising the temperature of the motor 40 and causing overheating of the switching element in the inverter 30. If a temperature sensor is provided to directly detect the temperature of each of the inverter 30 and the motor 40, economic burden is increased. Therefore, in the exemplary embodiment of the present invention, the temperature sensor can be omitted, and instead, the controller 60 estimates a motor power applied to the motor 40, which has a functional relationship with the motor temperature and the inverter temperature, and adjusts the running rate of the motor 40 according to the estimated motor power to prevent overheating of the motor 40 and the inverter 30.

Figure 2:
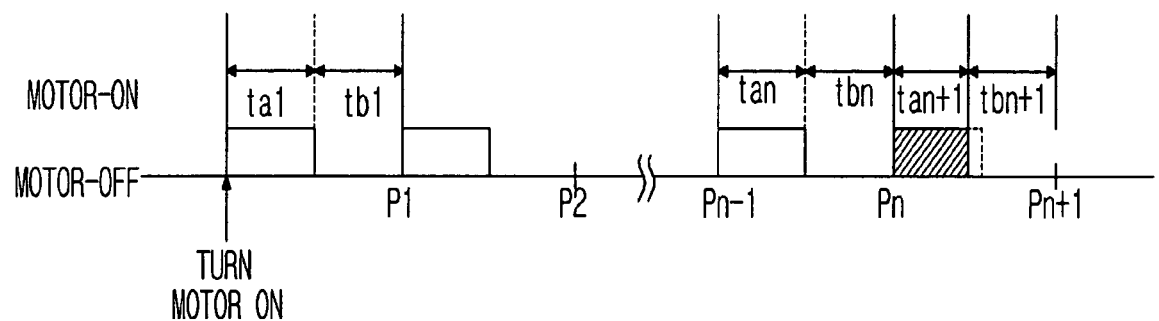
FIG. 2 is a diagram illustrating how a motor running rate is controlled according to an exemplary embodiment of the present invention.

As shown in FIG. 2, the motor 40 operates according to a running rate set for an operating cycle set by the user. Specifically, the motor 40 alternately runs and stops with the ratio of a motor-on time ($ta_1$) and a motor-off time ($tb_1$) according to the set running rate. If the motor 40 and the inverter 30 are expected to overheat since a motor power, estimated in a certain period ($P_n$) when the motor 40 is in operation, is high, an adjusted running rate is calculated by reducing the set running rate, and, from the next period ($P_{n+1}$), the motor 40 is driven according to the adjusted running rate to which a reduced on time ($ta_{n+1}$) is applied. This procedure, in which a motor power is estimated and the motor running rate is adjusted according to the estimated motor power, is continued also in the subsequent operation of the motor 40.

Figure 3:
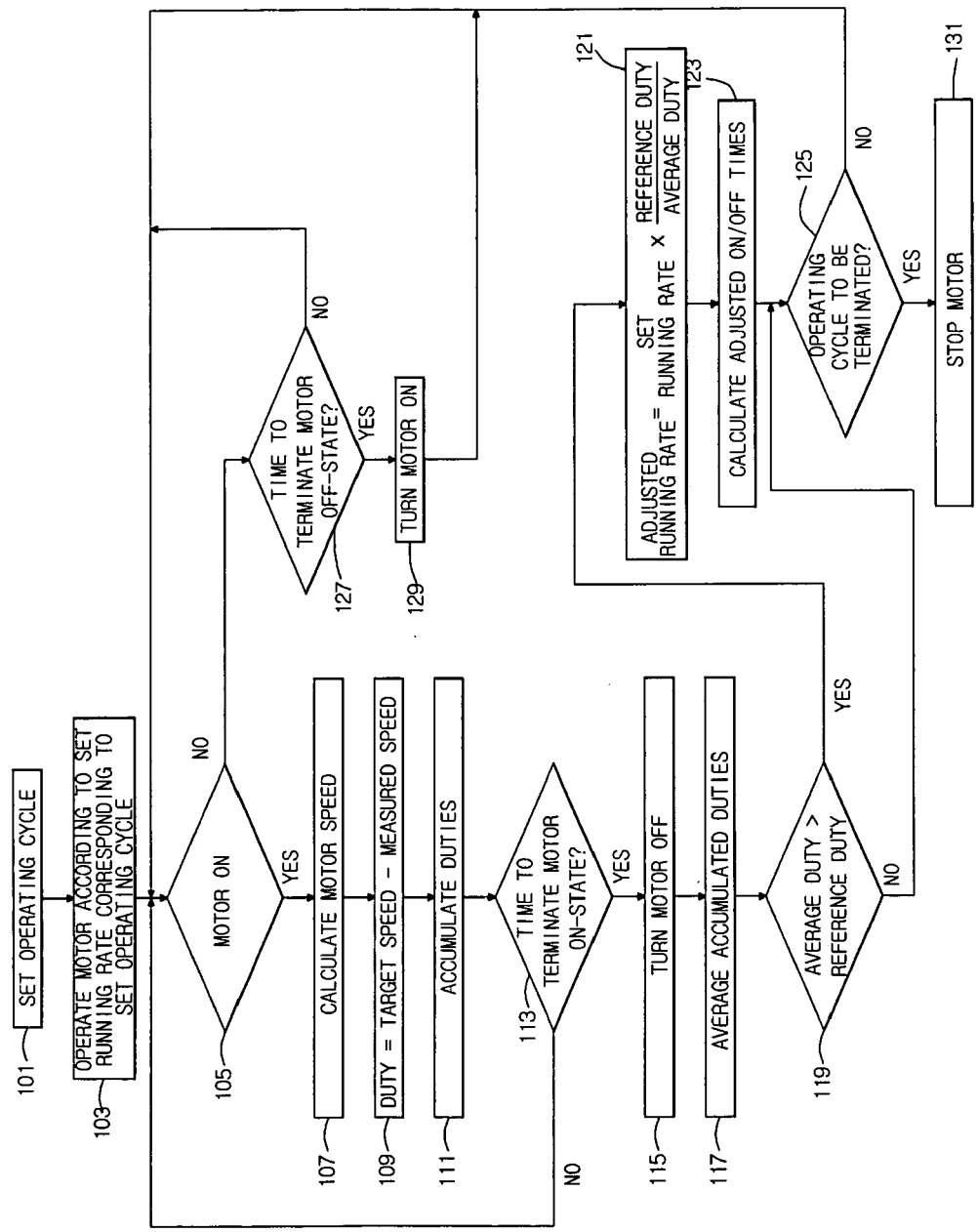
FIG. 3 is a flow chart of a method for controlling a motor in a washing machine according to an exemplary embodiment of the present invention.

With reference to FIG. 3, a detailed description will now be given of how the controller 60 estimates a motor power applied to the motor 40 based on the speed of the motor 40, and adjusts the running rate of the motor 40 based on the estimated motor power.

First, the user sets a desired operating cycle through the input unit 90 (101). The controller 60 receives information of a running rate corresponding to the set operating cycle from the storage unit 80, and controls the inverter driver 70 to drive the motor 40 according to the set running rate (103). In the set operating cycle such as a wash or rinse cycle, the motor 40 alternately runs during an on time and stops during an off time according to the set running rate.

While the motor is in operation, the controller 60 determines whether the motor is on (105), and calculates the speed of the motor 40 according to a motor speed signal from the speed sensor 50 if the motor is on (107). The controller 70 calculates the difference (hereinafter, also referred to as "duty") between the calculated motor speed and a target speed set according to the set operating cycle (109), and accumulates the calculated duty in the storage unit 80 (111). The controller 60 determines whether the time to terminate the on state of the motor 40 is reached (113), and advances to operation 105 if the time to terminate the on state of the motor 40 is not reached.

If it is determined in operation 113 that the time to terminate the on state of the motor 40 is reached, the controller 60 turns off the motor 40 (115), and calculates an average duty by averaging duties accumulated in the storage unit 80 during the motor-on time (117). The controller 60 determines whether the average duty is larger than a preset reference duty (119), and calculates an adjusted running rate in order to prevent overheating of the inverter 30 and the motor 40 if it is determined that the average duty is larger than the preset reference duty (121). The adjusted running rate is calculated based on the ratio of the average duty to the reference duty as expressed in the following equations.

Adjusted Running Rate=(set running rate)×(reference duty/average duty)

Set running rate=(set on time)×100/(set on time+set off time)

The controller 60 calculates an adjusted on time and an adjusted off time according to the adjusted running rate as expressed in the following equations (123).

Adjusted On Time=adjusted running rate×(set on time+set off time)/100

Adjusted Off Time=adjusted on time×(100−adjusted running rate)/adjusted running rate Then, the controller 60 determines whether the wash or rinse cycle is to be terminated (125), and advances to operation 105 if it is determined that the wash or rinse cycle is to be continued. If it is determined in operation 105 that the motor 40 is off, the controller 60 determines whether the time to terminate the off state of the motor 40 is reached (127). If the time to terminate the off state of the motor 40 is not reached, the controller 60 returns to operation 105 to continue the off state of the motor 40.

If it is determined in operation 127 that the time to terminate the off state of the motor 40 is reached, the motor 40 is turned on in the next period. The motor running rate according to the adjusted motor-on and motor-off times calculated in operation 123 is applied in the next period. The controller 60 then returns to operation 105 to repeat the above procedure (i.e., to calculate an average duty according to the adjusted motor running rate, and compare the average duty with the reference duty).

If it is determined in operation 125 that the wash or rinse cycle is to be terminated, the controller 60 interrupts the supply of power to the motor 40 to stop the motor 40.

As is apparent from the above description, the present invention provides an apparatus and method for controlling a motor in a washing machine, which have the following advantages. A motor power applied to the motor is estimated based on the speed of the motor, and the running rate of the motor is adjusted down if the estimated motor power is high, thereby preventing overheating of the motor and an inverter, which may be caused in wash or rinse cycles. In addition, the motor control apparatus according to the present invention can be implemented without using a temperature sensor as in the conventional motor control units, thereby reducing economic burden. Further, the motor does not stop due to an increase in the temperature of the motor, thereby preventing an unnecessary increase in the time required to complete washing.

Although exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An apparatus for controlling a motor in a washing machine, the apparatus comprising:
   a speed sensor which measures a speed of the motor; and
   a controller which determines an estimated motor power applied to the motor by comparing a measured speed of the motor and a target speed of the motor, determines an adjusted running rate of the motor by adjusting a running rate of the motor according to the estimated motor power, and controls the motor according to the adjusted running rate,
   wherein the controller determines the estimated motor power by averaging differences between the measured speed and the target speed, and determines the adjusted running rate by comparing an average difference between the measured speed and the target speed with a reference value.

2. The apparatus according to claim 1, further comprising:
   an input unit which sets an operating cycle of the washing machine; and
   a storage unit which stores a set running rate corresponding to the operating cycle,
   wherein the controller initially controls the motor according to the set running rate when the motor starts and then controls the motor according to the adjusted running rate, and generates the adjusted running rate by adjusting the running rate of the motor to be lower than the set running rate if the average of the differences between the measured speed and the target speed during an on time according to the set running rate is less than the reference value.

3. The apparatus according to claim 1, wherein the controller accumulates the differences between the measured speed and the target speed during an on time according to the running rate of the motor in each period of the motor, and averages the differences which are accumulated.

4. The apparatus according to claim 3, wherein if the controller determines in a period that it is desired to adjust the running rate of the motor, the controller uses the adjusted running rate from a next period.

5. A method for controlling a motor in a washing machine, the method comprising:
   setting a running rate of the motor according to an operating cycle of the washing machine;
   measuring a speed of the motor during an on time according to the running rate;
   determining an estimated motor power applied to the motor by comparing the measured speed with a target speed of the motor;
   adjusting the running rate of the motor according to the estimated motor power; and
   controlling the motor according to an adjusted running rate;
   wherein the comparing of the measured speed with the target speed comprises:
   averaging differences between the measured speed and the target speed during an on time according to the running rate of the motor; and
   comparing an average difference between the measured speed with a reference value; and
   the adjusting of the running rate comprises adjusting the running rate set for the operating cycle of the washing machine by decreasing the running rate if the average difference is larger than the reference value.

6. The method according to claim 5, wherein the adjusted running rated is determined based on the running rate set for the operation cycle, the average difference, and the reference value.

7. The method according to claim 6, wherein the operating cycle is a wash or rinse cycle in which the motor alternately runs and stops.

8. The method according to claim 5, wherein the running rate of the motor is applied on a periodic basis, and if it is determined that it is necessary to adjust the running rate of the motor according to the differences between the measured speed and the target speed in a period, an adjusted running rate is applied from a next period.

* * * * *